Dec. 16, 1924.
E. D. FINNEY
1,519,445
OIL WELL TOOL CONNECTION
Filed Dec. 20, 1922
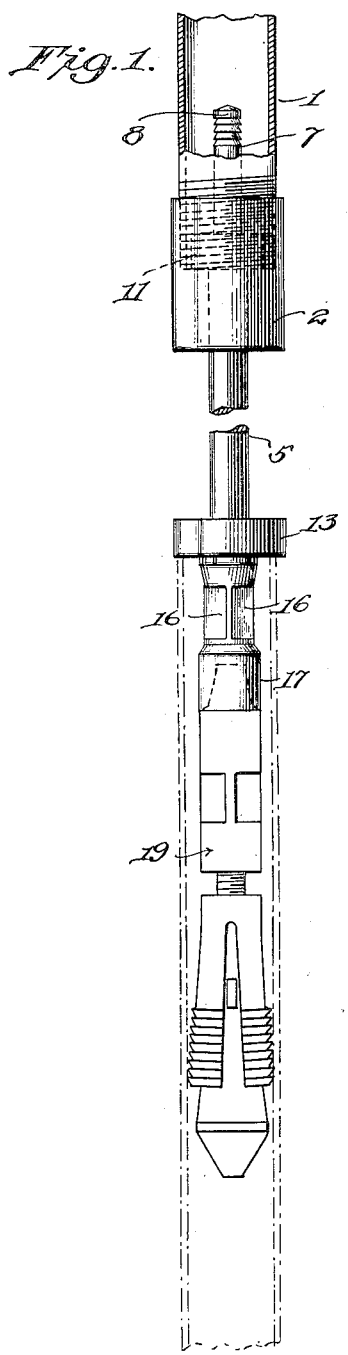
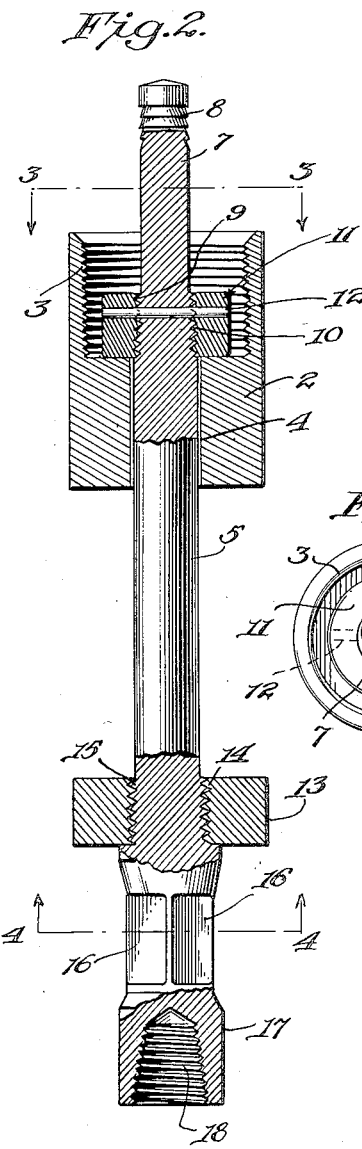
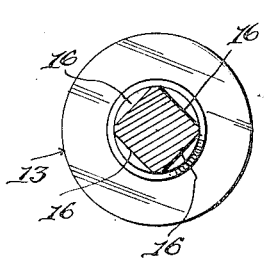
Inventor
Eben D. Finney
By Semmes & Semmes
Attorneys Patented Dec. 16, 1924.

1,519,445

UNITED STATES PATENT OFFICE.

EBEN D. FINNEY, OF RANGER, TEXAS.

OIL-WELL-TOOL CONNECTION.

Application filed December 20, 1922. Serial No. 608,091.

*To all whom it may concern:*

Be it known that EBEN D. FINNEY, a citizen of the United States, residing at Ranger, in the county of Eastland and State of Texas, has invented certain new and useful Improvements in Oil-Well-Tool Connections, of which the following is a specification.

My invention relates to apparatus for pulling objects from wells, and more particularly to the pulling of casings from oil wells.

It is an object of my invention to provide a casing to tool connection which will permit the lower casing to be pulled with the upper casing, but which at the same time permits the lower casing to be jarred loose, when stuck, and moved independently of all connection with the upper casing.

Another object of my invention is to provide a casing to tool connection which is simple in construction and has but few parts which are easily repaired or replaced at small cost.

Heretofore, in removing casings from wells the connection between the upper casing and the tool which grasped the lower casing has been rigid. In those instances where the lower casing did not stick, the upper casing could be pulled out and drag the lower casing with it. In such instances the old type connection between the upper casing and the tool has proven efficient. However, where the lower casing stuck it was then necessary to fasten a cable to the upper end of the casing-to-tool connection and then attempt to jar loose the lower casing. With the old type of connection the jar was transmitted to the upper casing as well as to the lower casing and a large portion of the force of the blows was wasted.

With these and other objects in view which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which for the purpose of explanation, have been made the subject of illustration.

In the drawings,

Figure 1 is a view in side elevation of my device as applied to a well casing;

Fig. 2 is a view in longitudinal section of my device;

Fig. 3 is a cross-sectional view taken on the lines 3—3 of Fig. 2;

Fig. 4 is a cross-sectional view taken on the lines 4—4 of Fig. 2.

My invention comprises a casing to tool connection which is adapted to slide through a bowl that is screw-threaded to the bottom of the upper casing. The connection is a metallic rod having at its upper end corrugations to permit it to be engaged by the socket of a cable tool. Within the casing and above the bowl is screw-threaded to the rod a strain-collar. Below the bowl for an appreciable distance the connection is without any protuberances so that it may reciprocate through the bowl. Below the bowl a stop-collar is screw-threaded to the connection and below the stop-collar are flattened surfaces on the rod whereby the rod may be gripped for rotation in fastening the tool to the rod. At the lower end of the rod is a tool joint connection in which the well tool is adapted to be screwed.

Referring to the drawings for a detailed description, I have shown an upper casing 1, provided with screw-threads at its lower end over which is screwed a bowl 2, having screw-threads 3 on its interior surface. Through the center of the bowl is a central, longitudinal aperture 4, through which is adapted to fit the shank 5 of a connector-rod whose upper extremity 7 is provided with circular corrugations or ridges 8. The rod 5 is provided with screw-threads 9 which engage screw-threads 10 of a strain-collar 11 and hold the strain-collar 11 in place with its lower side normally resting against the bowl 2. A locking pin 12 holds the strain-collar in place.

Located an appreciable distance below the bowl 2 and on the lower extremity of the shank 5 is a stop-collar 13, provided with interior screw-threads 14 which engage exterior screw-threads 15 on the connector-rod. The stop-collar 13, which is of the same diameter as the bowl 2, prevents the upward movement of the connector-rod further than the point at which the upper part of the stop-collar 13 engages the lower part of the bowl 2.

Below the stop-collar 13 are located flattened surfaces 16 which permit the application of a wrench to turn the connector-rod or hold it steady when fitting tools or removing them. Below the flattened surfaces is a tool joint box 17 which is of slightly larger diameter than the shank 5 and is provided on its interior with screw-threads 18 in which a tool, such as the spear 19 shown in Fig. 1, may be fastened.

In operation, the bowl 2 having been screwed to the lower end of the upper casing 1, the upper casing 1 is let down and the tool 19 is forced down into the lower casing until the stop-collar 13 prevents its further downward movement. The spear 19 grips the lower casing and the upper casing is raised, carrying with it the lower casing. Should the lower casing become stuck, cable tools are let down in the upper casing and grip the corrugations 8 of the upper portion 7 of the connector-rod by means of a combination socket or any other suitable gripping means well known in the art.

The jars transmitted to the connector-rod are also transmitted to the lower casing and tend to either work loose the lower casing or part it, or break the spear's hold. In case the casing is jarred loose it will be worked up by successive blows the length of the shank 5 until the stop-collar 13 comes in contact with the lower surface of the bowl 2. The upper casing 1 may then be moved up until the strain-collar 11 contacts with the interior upper surface of the bowl 2, and the jarring process may be repeated. In repeated operations the lower casing may be jarred up for the length of the shank 5, and by repeating the process the lower casing may be removed or it may be brought to a point at which it is no longer stuck, and it may be withdrawn in the usual fashion by pulling on the upper casing 1.

In the drawings I have shown the device as operating with a spear, but any mandrel, socket or other appliance may be used with my casing to tool connection, and I do not wish to be limited to the use of a spear.

My device permits a casing to be jarred loose with greater facility than was heretofore possible by reason of the fact that the jar is transmitted solely to the tool and the lower casing, and does not expend itself in jarring the upper casing, as previously.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A casing to tool connection comprising a tool-holding connector-rod, an upper pulling member, and means forming part of the connector-rod whereby said rod may be reciprocated independently of said pulling member.

2. A casing to tool connection comprising an upper casing, a strain-receiving member attached thereto, a tool-holding connector-rod, means on the rod cooperating with the strain-receiving member whereby the rod may be reciprocated without moving the upper casing.

3. A casing to tool connection comprising an upper casing, a bowl having an aperture therein attached to the lower end thereof, a tool-holding connector-rod adapted to reciprocate through the aperture in the bowl, a strain-collar on the rod above the bowl, and a stop-collar below the bowl.

4. A casing to tool connection comprising an upper casing, a strain-receiving member attached thereto, a tool-holding connector-rod reciprocable in said member, a strain-collar on the rod above the strain-receiving member, and a stop-collar below the member.

5. A casing to tool connection comprising a tool-holding connector-rod, an upper pulling member, a strain-collar on the rod above the upper pulling member, and a stop-collar on the rod below said member whereby said rod may be reciprocated for a limited distance independently of said member.

6. A casing to tool connection comprising an upper casing, screw-threads on the casing, a bowl having an aperture therein, screw-threads on the bowl cooperating with the screw-threads on the casing, a tool-holding connector-rod adapted to reciprocate through the aperture in the bowl, means on the upper end of the connector rod whereby it may be gripped, a strain-collar screw-threaded to the connector-rod above the bowl, and a stop-collar located an appreciable distance below the bowl.

7. A casing to tool connection comprising an upper casing, a bowl having an aperture therein attached to the lower end of the casing, a tool-holding connector-rod adapted to reciprocate through the aperture in the bowl, means on the upper end of the connector-rod whereby it may be gripped, a strain-collar normally adapted to bear against the bowl, and a stop-collar located an appreciable distance below the bowl.

8. A casing to tool connection comprising an upper casing, a bowl having an aperture therein attached to the lower end of the casing, a tool-holding connector-rod adapted to reciprocate through the aperture in the bowl, means on the upper end of the connector rod whereby it may be gripped, a strain-collar screw-threaded to the connector-rod and normally adapted to bear against the bowl, and a stop-collar screw-threaded to the connector-rod located an appreciable distance below the bowl.

9. A casing to tool connection comprising an upper casing, a bowl having an aperture therein attached to the lower end of the casing, a tool-holding connector-rod adapted to reciprocate through the aperture in the bowl, means on the upper end of the connector rod whereby it may be gripped, a strain-collar screw-threaded to the connector-rod and normally adapted to bear against the bowl, a stop-collar screw-threaded to the connector-rod located an appreciable distance below the bowl, and a tool joint connection at the lower end of the connector-rod.

10. A casing to tool connection comprising an upper casing, screw-threads on the casing, a bowl having an aperture therein, screw-threads on the bowl cooperating with screw-threads on the casing, a tool-holding connector-rod adapted to reciprocate through the aperture in the bowl, means on the upper end of the connector-rod whereby it may be gripped, a strain-collar screw-threaded to the connector-rod above the bowl, a stop-collar screw-threaded to the connector-rod below the bowl, and a tool joint connection at the lower end of the connector-rod.

11. A casing to tool connection comprising an upper casing, a bowl having an aperture therein attached to the lower end of the casing, a tool-holding connector-rod adapted to reciprocate through the aperture in the bowl, means on the upper end of the connector-rod whereby it may be gripped, a strain-collar normally adapted to bear against the bowl, a stop-collar screw-threaded to the connector-rod below the bowl, and a tool joint connection at the lower end of the connector-rod.

12. A casing to tool connection comprising an upper casing, a bowl having an aperture therein attached to the lower end of the casing, a tool-holding connector-rod adapted to reciprocate through the aperture in the bowl, means on the upper end of the connector-rod whereby it may be gripped, a strain-collar normally adapted to bear against the bowl, a stop-collar screw-threaded to the connector-rod below the bowl, a tool joint connection at the lower end of the connector-rod, and flattened surfaces on the connector-rod whereby the rod may be gripped for rotation.

13. In a casing to tool connection, the combination of an upper casing, with a strain-receiving member attached thereto, a tool-holding connector-rod, means on the rod cooperating with the strain-receiving member whereby the rod may be reciprocated, a lower casing and a stop member on the rod preventing downward movement of the tool in the lower casing beyond a predetermined point.

In testimony whereof I affix my signature.

EBEN D. FINNEY.